Dec. 22, 1953  G. S. RAMSEY  2,663,121
COMBINATION PRESSURE REDUCING REGULATOR AND RELIEF VALVE
Filed Jan. 13, 1951
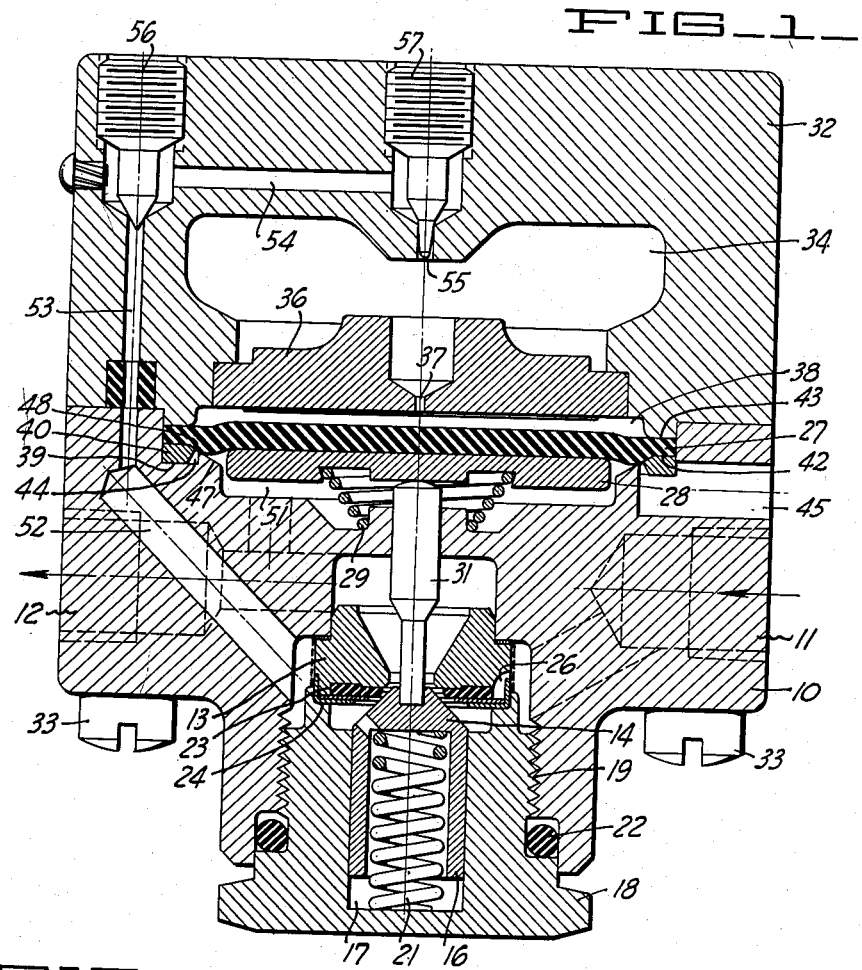
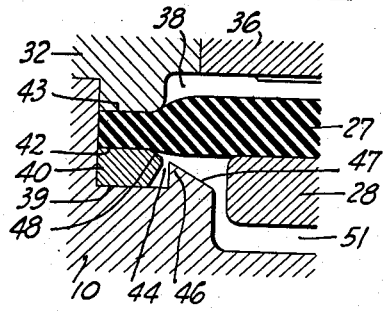 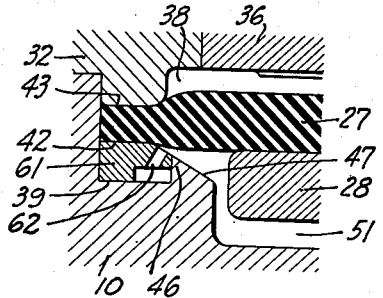
INVENTOR.
Grover S. Ramsey
BY
ATTORNEYS Patented Dec. 22, 1953

2,663,121

UNITED STATES PATENT OFFICE 2,663,121

COMBINATION PRESSURE REDUCING REGULATOR AND RELIEF VALVE

Grover S. Ramsey, Berkeley, Calif., assignor to Grove Regulator Company, Oakland, Calif., a corporation of California Application January 13, 1951, Serial No. 205,926

3 Claims. (Cl. 50—21)

This invention relates generally to devices serving both the function of a pressure reducing regulator and a relief valve.

Pressure reducing regulators commonly make use of a pressure operated diaphragm which is operatively connected to a valve member for controlling flow of fluid from a high pressure source to a low pressure system. The diaphragm is mounted whereby a chamber on one side is in communication with the outflow (i. e. low pressure) side of the regulator. Loading force is applied to the diaphragm, and the magnitude of the loading force determines the outflow pressure maintained. The loading force can be provided by a compression spring or by application of fluid pressure. For relatively high pressures it is advantageous to use gas pressure loading as disclosed in Grove 2,047,101, wherein fluttering of the diaphragm and resulting chattering of the valve member is prevented by the use of a rigid plate that extends in close proximity with one side of the diaphragm. This plate has a small controlling orifice communicating between the confined space between the plate and the diaphragm and a gas loading chamber. One problem which is present in the operation of pressure reducing regulators is that of preventing an excessive pressure upon the outflow side. For this purpose separate pressure relief valves have been employed, which are set to vent off fluid from the outflow side when the pressure exceeds a predetermined value. The conventional type of pressure relief valve, when employed in this manner, has several undesirable characteristics. It requires adjustment independent of setting of the pressure reducing regulator. Furthermore it is a separate unit of substantial cost which must be separately installed and maintained.

In place of employing a separate pressure relief valve, it has been proposed to provide a built-in pressure relief regulator, as shown particularly in Grove et al. 2,487,650. The arrangement in this instance avoids separate adjustment of the pressure relief valve for different settings of the pressure reducing regulator, but it is subject to the disadvantage that it requires a separate flexible diaphragm in addition to the regular diaphragm of the pressure reducing regulator. Furthermore other parts are required in such a device, tending to make it relatively expensive to construct compared to the present invention.

It is an object of the present invention to provide an improved combination pressure reducing regulator and relief valve which is of extreme simplicity with respect to both construction and mode of operation.

A further object of the invention is to provide a device of the above character which is characterized by the use of a single diaphragm for both pressure reducing and pressure relief functions.

Additional objects of the invention will appear from the following description in which the preferred embodiments have been set forth in detail in conjunction with the accompanying drawing.

Referring to the drawing:

Figure 1 is a side elevational view in section illustrating a combination pressure reducing regulator and relief valve incorporating the present invention.

Figure 2 is a cross-sectional detail serving to illustrate the operating diaphragm in relief venting position.

Figure 3 is a cross-sectional detail serving to illustrate a modification of the invention.

The device illustrated in the drawing utilizes the features of the regulator disclosed in the aforementioned Grove Patent 2,047,101. It consists of a body 10 provided with the inflow and outflow passages 11 and 12. Interposed between these passages there is a seat ring 13, which cooperates with a movable valve member 14. The valve member in this instance is shown extended to provide the piston or plunger portion 16 which is slidably fitted within the cylindrical bore 17. A body closure plug 18 is machined to provide the bore 17, and has threaded engagement 19 with the body. A compression spring 21 normally urges the valve member toward closed position. The closure plug is sealed with respect to the body by suitable means such as the resilient O ring 22.

The seat ring 13 can be provided with resilient sealing means as shown in Gannon 2,485,092. Thus a relatively thin annulus 23 is positioned upon the lower inflow side of the seat ring, and is held in operative position by the metal retaining cap 24. Space venting slots 26 are shown in the peripheral edge of the seat ring to avoid application of a pressure differential tending to dislodge the annulus 23. The inner peripheral edge of the annulus 23 engages and seals upon the conical valve surface of member 14.

The body serves to mount a flexible operating diaphragm 27 which is preferably made of suitable resilient material such as synthetic rubber or rubber-like compound. One side of this diaphragm is engaged by the circular diaphragm plate 28, and this plate is urged against the diaphragm by a light compression spring 29. A push rod or stem 31 is slidably guided within the body and has its one end in abutment with the diaphragm plate 28, and its other end operatively connected to the valve member 14.

A dome part 32 is mounted upon the body 10, and secured thereto by suitable means such as the screws 33. The dome part is formed to provide the dome chamber 34 and is also provided with a rigid plate 36. This plate extends in close proximity with the adjacent side of the diaphragm 27, and is provided with a relatively small orifice 37, which serves to establish communication between the confined space 38 between plate 36 and diaphragm 27 and the dome chamber 34. Plate 36 and orifice 37 correspond to the plate 58 and orifice 62 of Grove 2,047,101 (Figure 1), and serve to prevent fluttering or chattering action.

Means are provided on the body and dome parts to form annular shoulder faces which clamp upon the peripheral margin of the diaphragm 27. Thus the body is machined to provide the annular recess 39 which accommodates the metal ring 40. The one face 42 of this ring forms a shoulder face in opposed relation with the annular shoulder face 43 formed on the dome part. The margin of the diaphragm is squeezed sufficiently tight between these shoulder faces to form a fluid tight seal.

In proximity with the shoulder face 42 I provide one or more pressure relief vents which are normally closed by the adjacent portion of the diaphragm, but which are opened to permit venting to the atmosphere under conditions of extreme pressure upon the outflow side. In the embodiment of Figures 1 and 2, a single venting orifice 44 is provided, which communicates with the duct 45 leading to the atmosphere. Orifice 44 is annular in this instance, and is formed as a narrow gap between the inner periphery of ring 40 and the outer periphery of the adjacent annular body portion 46. It will be noted that the annular body portion 46 is provided with a conical shaped face 47, against which the diaphragm may press when the pressure in chamber 34 greatly exceeds that on the other side of the diaphragm. Ring 40 is provided with a beveled conical shaped face 48 which is generally formed on the same bevel or slope as the face 47. Face 48 likewise serves to engage and support the diaphragm when the latter is flexed downwardly.

In order to apply controlling pressures to the diaphragm the body is formed to provide the chamber 51, which is in communication with the outflow passage 12. It will be noted that this chamber is freely in communication with the orifice 44, when the diaphragm is flexed upwardly as illustrated in Figure 2.

Suitable means can be provided for adjusting the pressure of gas in the dome chamber 34. Thus ducts 52, 53, 54 and 55 are shown connecting the inflow side of the regulator with the dome chamber 34, through the manually operated needle valves 56 and 57. When it is desired to increase the loading, and thus increase the pressure maintained upon the outflow side, both needle valves 56 and 57 can be temporarily opened to admit gas from the inflow side of the regulator to the chamber 34. When it is desired to reduce the loading, the valve 57 is opened while valve 56 remains closed, thereby permitting venting about the threads of the valve 57 to reduce the pressure.

Operation of the device described above is as follows: Assuming that the inflow and outflow passages are connected with associated piping, and that a source of high pressure gas is applied to the inflow, the pressure maintained in the outflow piping will depend upon the loading in the dome chamber 34, the action in this respect being the same as described in Grove 2,047,101. For normal downflow pressures the diaphragm will be flexed downwardly sufficiently far to seal across the orifice 44, substantially as shown in Figure 1. This applies to both intermediate and closed positions of the valve member. In the event the pressure upon the downflow side greatly exceeds that for which the pressure reducing regulator is set, the diaphragm 27 is flexed upwardly sufficiently far to lift the margin of the diaphragm from the orifice 44, thus permitting the outflow fluid to vent to the atmosphere through chamber 51, orifice 44 and passage 45. The outflow pressure required to flex the diaphragm sufficiently far to open the orifice 44 is dependent upon the value of loading pressure maintained in the chamber 34. Therefore changes in the loading pressure, such as are made to adjust the outflow pressure to be maintained, serve to automatically adjust the setting of the pressure relief means.

In the embodiment of the invention described above, the relief orifice is annular in form and extends about the peripheral margin of the diaphragm. As illustrated in Figure 3 it is possible to provide a plurality of individual venting ducts in place of a continuous orifice. Thus in this instance the ring 61, corresponding to the ring 40, is provided with a plurality of circumferentially spaced venting openings 62. These openings can be drilled at circumferentially spaced intervals in the ring 61, as illustrated.

It will be evident from the foregoing that I have provided a combination device which serves to reduce pressure, to normally maintain a constant pressure on the outflow side, and to relieve excessive outlet pressure which may be imposed under abnormal conditions. The device is of extreme simplicity, requiring a minimum of parts, and particularly making use of the same diaphragm which functions for the pressure reduction.

I claim:

1. In a combination pressure reducing regulator and relief valve, a body having inflow and outflow passages, a valve member within the body and movable to control flow of fluid therethrough, a flexible diaphragm operatively connected to operate the valve member, a loading dome clamped upon the body, said body and loading dome being formed to provide opposed annular shoulder faces adapted to clamp and seal upon the margin of the diaphragm, said body providing a chamber on the body side of the diaphragm which is in communication with the outflow side of the regulator, said dome part providing a chamber upon the other side of the diaphragm adapted to receive gas under pressure to apply loading force upon the diaphragm, and pressure relief venting means associated with said diaphragm, said last means including a duct formed in the body communicating with the atmosphere and a venting orifice communicating between said first named chamber and said duct, said orifice being located adjacent the margin of the diaphragm whereby said orifice is normally closed by the diaphragm and is opened by abnormal flexing of the diaphragm by excessive pressure applied to said first chamber.

2. A device as in claim 1 in which the relief orifice is annular and interposed between parts presenting conical shaped faces to the diaphragm.

3. In a combination pressure reducing regulator and relief valve, a body having inflow and outflow passages, a valve member within the body and movable to control flow of fluid therethrough, a diaphragm serving to operate the valve member, mounting means for the diaphragm including opposed annular shoulder faces clamped upon the margin of the diaphragm, means forming a chamber upon one side of the diaphragm which is in communication with the outflow side of the regulator, means forming a closed chamber on the other side of the diaphragm adapted to receive gas under pressure to apply loading force upon the diaphragm, means forming an annular surface on said one side of the diaphragm adjacent one of the shoulder faces and adapted to engage an adjacent margin of the diaphragm, and pressure relief venting means associated with said diaphragm, said last means including a venting orifice disposed on said one side of the diaphragm in close proximity with the corresponding shoulder face and interrupting said surface, said orifice being normally engaged and closed by downward flexing of the diaphragm under the urge of loading force and being disengaged and opened by abnormal flexing of the diaphragm in an opposite direction under the force of excessive pressure in said first named chamber.

GROVER S. RAMSEY.

References Cited in the file of this patent

UNITED STATES PATENTS

| Number | Name | Date |
|---|---|---|
| 2,304,782 | Donaldson | Dec. 15, 1942 |
| 2,416,855 | St. Clair | Mar. 4, 1947 |